United States Patent [19]

Tanaka

[11] Patent Number: 4,882,495
[45] Date of Patent: Nov. 21, 1989

[54] SCINTILLATION CAMERA

[75] Inventor: Masatoshi Tanaka, Chiba, Japan

[73] Assignee: Hitachi Medical Corporation, Tokyo, Japan

[21] Appl. No.: 188,173

[22] Filed: Apr. 26, 1988

Related U.S. Application Data

[63] Continuation of Ser. No. 817,614, Jan. 10, 1986, abandoned.

[30] Foreign Application Priority Data

Jan. 12, 1985 [JP] Japan ................................ 60-2634

[51] Int. Cl.$^4$ .............................................. G01T 1/208
[52] U.S. Cl. ............................ 250/363.09; 250/363.02
[58] Field of Search ..................... 250/303 S, 369, 366, 250/363.02, 363.09; 364/414, 413.24, 413.26

[56] References Cited

U.S. PATENT DOCUMENTS 4,517,460  5/1985  Meulenbrugge et al. ..... 250/363 SG
4,566,074  1/1986  Nishikawa ........................... 364/414

FOREIGN PATENT DOCUMENTS 2065763  3/1976  Fed. Rep. of Germany ... 250/363 S
0060380  4/1984  Japan ................................. 250/369

Primary Examiner—Janice A. Howell
Assistant Examiner—Richard Hanig
Attorney, Agent, or Firm—Gerald J. Ferguson, Jr.

[57] ABSTRACT

In a scintillation camera having a scintillator, a plurality of photomultiplier tubes optically coupled with the scintillator for converting light flashes into electric signals, and a position calculating circuit for calculating incident positions of radioactive rays on the scintillator to produce a position signal indicative of the position of each photomultiplier tube and a display signal, a photomultiplier tube changeover circuit for determining in response to the position signal which one of the photomultiplier tubes has been just irradiated with radiation rays and for outputting output signals only from each photomultiplier tube, an averaging circuit for taking an arithmetical average of the output signals with respect to a predetermined number of the output signals to thereby obtain an average thereof, a correction value calculating circuit for detecting a variation in the sensitivity of each photomultiplier tube by comparing the averaged magnitude of the output signals from the averaging circuit with a reference value determined by the energy of the incident radioactive rays to thereby calculate a correction value for each photomultiplier tube: and a photomultiplier tube correcting circuit for controlling a voltage applied to each photomultiplier tube to thereby automatically adjust the sensitivity of each of the photomultiplier tubes.

6 Claims, 3 Drawing Sheets

SCINTILLATION CAMERA

BACKGROUND OF THE INVENTION

This application is a continuation of Ser. No 817,614, filed Jan. 10, 1986, abandoned. 1. Field of the Invention The present invention relates to scintillation cameras for medical diagnoses of subjects and the like by the use of radioactive rays and, more particularly, relates to scintillation cameras in which the change in sensitivity of a photomultiplier tube of a radiation detector is continuously detected and automatic adjustment is performed so as to prevent the sensitivity of the photomultiplier tube from fluctuating.

2. Description of the Prior Art

Generally, a scintillation camera is an apparatus arranged such that distribution of a radioisotope or the like injected into a subject, e.g., a human body, is detected by a radiation detector, the electric signal from the detector is transformed into coordinates (X, Y) by a position calculating circuit, and a distribution image of incident radioactive rays is displayed on a display unit such as a cathode-ray tube or the like. Recently, uniformity of an image in scintillation cameras of this kind has been improved by the introduction of correcting means utilizing micro-computers. Since the correcting means of this type is used to improve the uniformity of the image by correcting image signals of the scintillation camera with correction data made by measuring uniformity of the scintillation camera body per se, the correction data often becomes unsuitable owing to variations in uniformity of the scintillation camera body per se, resulting in deterioration in uniformity of the image.

A main cause of the change in uniformity of the scintillation camera body is variations in sensitivity of photomultiplier tubes in the radiation detector with the passage of time. To cope with this problem, conventionally, removal of fluctuation in the sensitivity of the photomultiplier tubes has been attempted in the following manner. That is, as shown in FIG. 5, in a scintillation camera including a scintillator 1, a plurality of photomultiplier tubes 2, a position calculating circuit 3, and a display unit 4, there is provided a circuit for the detection adjustment of variations in sensitivity of the photmultiplier tubes 2, the circuit being constituted by a changeover switch 5, a signal changeover circuit 6, an averaging circuit 7, a correction value calculating circuit 8, a correction value memory 9, a correcting circuit 10, and a lamp 11. The adjusting operation of the circuit will be described in detail hereunder.

First, a radiation source such as a radioisotope or the like is packed in a cylindrical case 12 made of lead and having one end perforated for emitting fine beam radiation of rays such as γ-rays or the like, and this lead case 12 is disposed just under a desired one of the photomultiplier tubes 2 the sensitivity of which is to be adjusted. Next, the signal changeover circuit 6 is changed over by the changeover switch 5 such that only the output signal from the above-mentioned desired one photomultiplier tube 2 is supplied to the averaging circuit 7, among the outputs of the plurality of photomultiplier tubes 2. This averaging circuit 7 calculates an arithmetical average of the respective magnitudes of the output signals of the desired one photomultiplier tube 2 with respect to a predetermined number of incident radioactive rays (e.g., 1000 of rays), so as to remove the statistical variations of the output signal of the photomultiplier tube 2. Next, the arithmetical average from the averaging circuit 7 is supplied to the correction value calculating circuit 8. This correction value calculating circuit 8 calculates the difference between the arithmetical average and a reference value datermined in accordance with the energy of incident radioactive rays, the difference corresponding to the variations in sensitivity of the photomultiplier tube 2 to be adjusted. Thus, the lead case 12 with the radiation source is disposed just under every one of the photomultiplier tubes one after another and every time the lead case 12 is displaced, the signal changeover circuit 6 is also changed over by the changeover switch 5 to take in the output signals from the photomultiplier tube 2 to be adjusted. In this manner, all the photomultiplier tubes 2 are adjusted through the above-mentioned adjusting operation.

However, scintillation cameras of this kind have a disadvantage in that the sensitivity adjusting operation is complicated, since the lead case 12 with the radiation source must be moved so as to be disposed just under each one of the plurality of photomultiplier tubes 2 one after another and every time the lead case 12 is displaced the changeover switch 5 must be operated to change over the signal changeover circuit 6. In the instance where the displacement of the lead case 12 and the operation of the changeover switch 5 are automatically performed, on the other hand, there is another disadvantage in that the structure for the adjustment of sensitivity becomes complicated and large. Moreover, the sensitivity of each of the photomultiplier tubes 2 must be adjusted at a specific time other than the test time for a subject and it is thus impossible to continuously detect and remove the variations in sensitivity of the photomultiplier tube with the passage of time.

SUMMARY OF THE INVENTION

It is therefore an object of the present invention to eliminate the foregoing disadvantages in the prior art.

To attain the above-mentioned object, according to an aspect of the present invention, in a scintillation camera for obtaining a distribution image of incident radioactive rays from a subject, having a scintillator for emitting flash light owing to incident radioactive rays, a plurality of photomultiplier tubes each optically coupled with the scintillator for converting light into electric signals, and a position calculating circuit for calculating incident positions of the radioactive rays on the basis of the output signals of the photomultiplier tubes to produce position signals and a display signal to a display unit, there are provided a photomultiplier tube changeover circuit for selecting on the basis of the position signal from the position calculating circuit the photomultiplier tube just upwardly irradiated with the radiation rays from its under side and for allowing an output signal only from the selected photomultiplier tube; an averaging circuit for taking an arithmetical average of output signals from the photomultiplier tube changeover circuit for each selected photomultiplier tube with respect to a predetermined number of incident radioactive rays irradiated onto the photomultiplier tube to thereby average the magnitude of the output signals of the photomultiplier tube; a correction value calculating circuit for detecting a variation in sensitivity of each selected photomultiplier tube by comparing the averaged magnitude of the output signals from the averaging circuit with a reference value determined by the energy of the incident radioactive rays to thereby calculate a correction value for each selected photomultiplier tube; and a photomultiplier tube correcting circuit for controlling a voltage applied to each selected photomultiplier tube to thereby automatically adjust the sensitivity of each selected photomultiplier tube.

DETAILED DESCRIPTION OF PREFERRED EMBODIMENTS

Referring t the drawings, preferred embodiments of the present invention will be described in detail hereunder.

Figure 1:
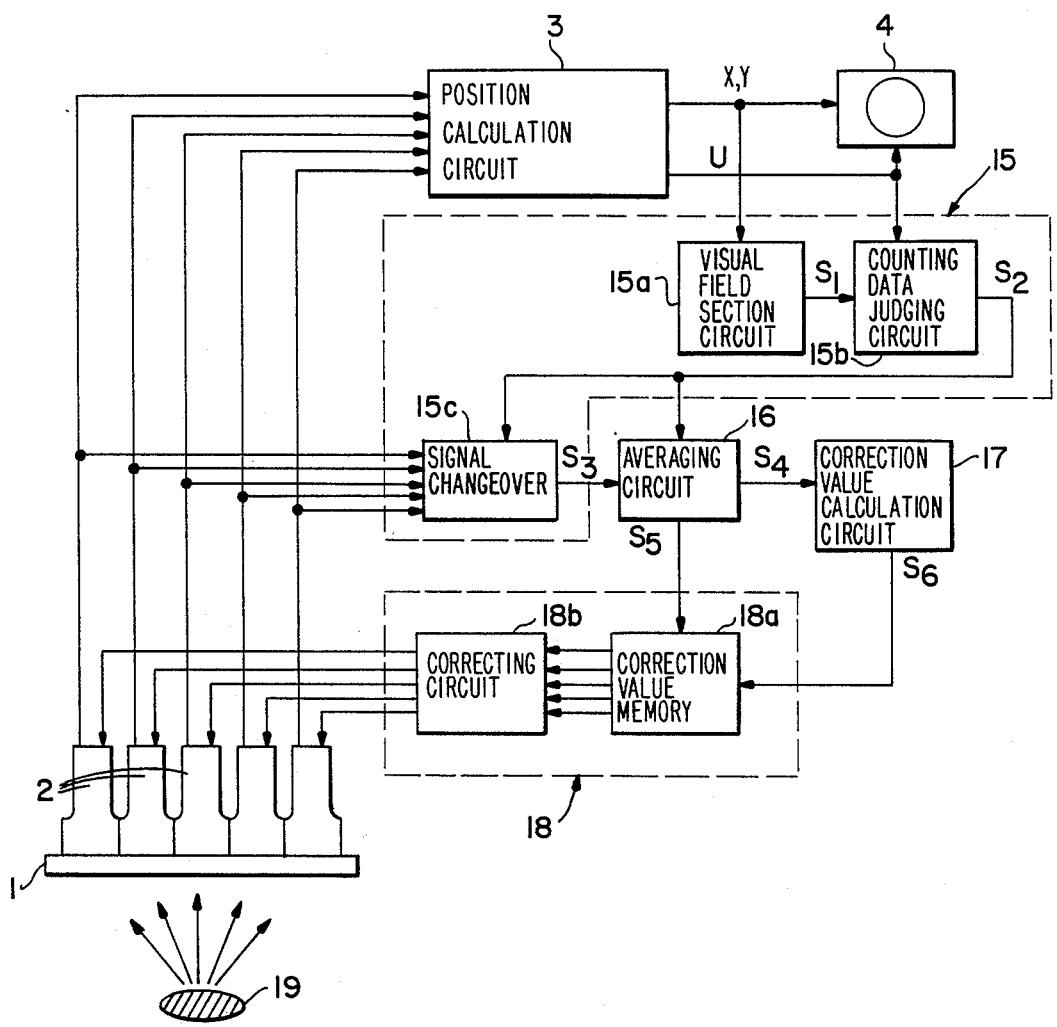
FIG. 1 is a block diagram of an illustrative scintillation camera according to the present invention.

FIG. 1 in a block diagram showing a scintillation camera according to the present invention. The scintillation camera has a scintillator 1, a plurality of photomultiplier tubes 2, a position calculating circuit 3, a display unit 4, a photomultiplier tube changeover circuit 15, an averaging circuit 16, a correction value calculating circuit 17, and a photomultiplier tube correcting circuit 18.

The scintillator 1 flashes at an incident point thereof to detect incident radioactive rays when radioactive rays such as γ-rays or the like are emitted from a radiation source 19 at a subject to be tested. The plurality of photomultiplier tubes 2 are disposed on the back side of the scintillator 1 over the whole surface thereof. Each of the photomultiplier tubes 2 detects the flash of the scintillator 1 and converts it into an electric signal having a magnitude in proportion to the amount of the incident rays. The output signals from the respective photomultiplier tubes 2 are supplied to the position calculating circuit 3. The position calculating circuit 3 calculates the incident position of the radioactive rays on the basis of the differences in magnitude of the output signals from the respective photomultiplier tubes 2, transforms the incident position into X-Y coordinates, and produces a position signal (x, y) and the display signal U are supplied to the display unit 4 from the position calculating circuit 3. The display unit 4 indicates bright spots at positions corresponding to the position signal (x, y) owing to the display signal U. A group of the bright spots displays a distribution image of incident radioactive rays from a subject.

Figure 2:
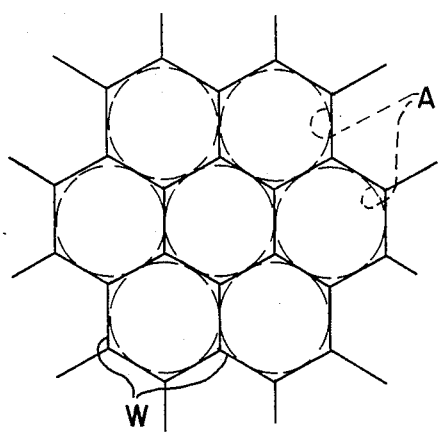
FIG. 2 is a view showing electrical windows of a visual field section circuit.
Figure 3:
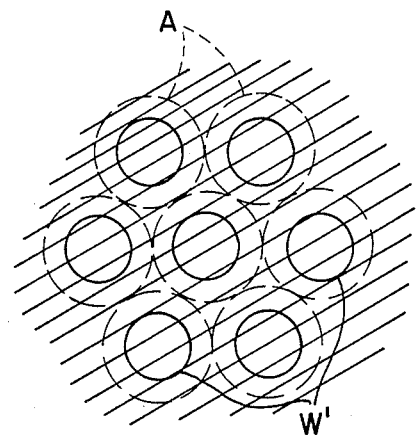
FIG. 3 is a view showing a modification of FIG. 2.

The position signal (x, y) is applied also to the photomultiplier tube changeover circuit 15 from the position calculating circuit 3. The photomultiplier tube changeover circuit 15 selectes on the basis of the position signal (x, y) which one of the photomultiplier tubes 2 has just been irradiated with the radiation rays from its underside and allows only the output signal from the selected photomultiplier tube 2 to pass. Changeover circuit 15 includes a visual field section circuit 15a, a counting rate judging circuit 15b, and a signal changeover circuit 15c. The visual field section circuit 15a sections the visual field of the camera on the incident radioactive rays for every photomultiplier tube 2 to output a section signal $S_1$. As shown in FIG. 2, the visual field section circuit 15a has electrical windows W, W . . . shown by sexangles of solid line and formed corresponding to the position signal (x, y) such that each window W encloses corresponding ones of the photoreceptive areas A, A . . . of the respective photomultiplier tubes 2, 2 . . . shown by circles of broken line, thereby selecting which one of the photomultiplier tubes 2 was just upwardly irradiated with radioactive rays incident directly thereunder. The electrical window W need not always be formed in a sexangle-shape, but may be in the form of a circle or a quadrangle. Alternatively, the electrical window W may be formed as a window W which is smaller in radius than the photoreceptive area A of the respective photomultiplier tube 2, as shown in FIG. 3, so as to form the visual field of the camera sectioned into the center portions of the respective photoreceptive areas A. The section signal $S_1$ is supplied to the counting rate judging circuit 15b from the visual field section circuit 15a. The counting rate judging circuit 15b measures the respective counting rates of incident radioactive rays in the sections of the visual field corresponding to the respective photomultiplier tubes 2 and transmits a changeover signal $S_2$ for a specified one of the photomultiplier tubes 2. That is, the counting rate judging circuit 15b receives the display signal U from the position calculating circuit 3 as well as the section signal $S_1$, compares the counting rate in a specific one of the sections of the visual field irradiated with radioactive rays with a preset reference value when the radioactive rays impinge thereon once, and produces the changeover signal $S_2$ for the photomultiplier tube 2 belonging to the specific visual field section only when the compared counting rate exceeds the preset reference value. The changeover signal $S_2$ is supplied to the signal changeover circuit 15c from the counting rate judging circuit 15b. The signal changeover circuit 15c receives the respective output signals of the plurality of photomultiplier tubes 2 and permits only one of the received output signals to pass therethrough. The signal changeover circuit 15c may be, for example, a multiplexer which changes over internal contacts thereof in response to the changeover signal $S_2$ so as to transmit only an output signal $S_3$ of the photomultiplier tube 2 corresponding to the changeover signal $S_2$.

Figure 4:
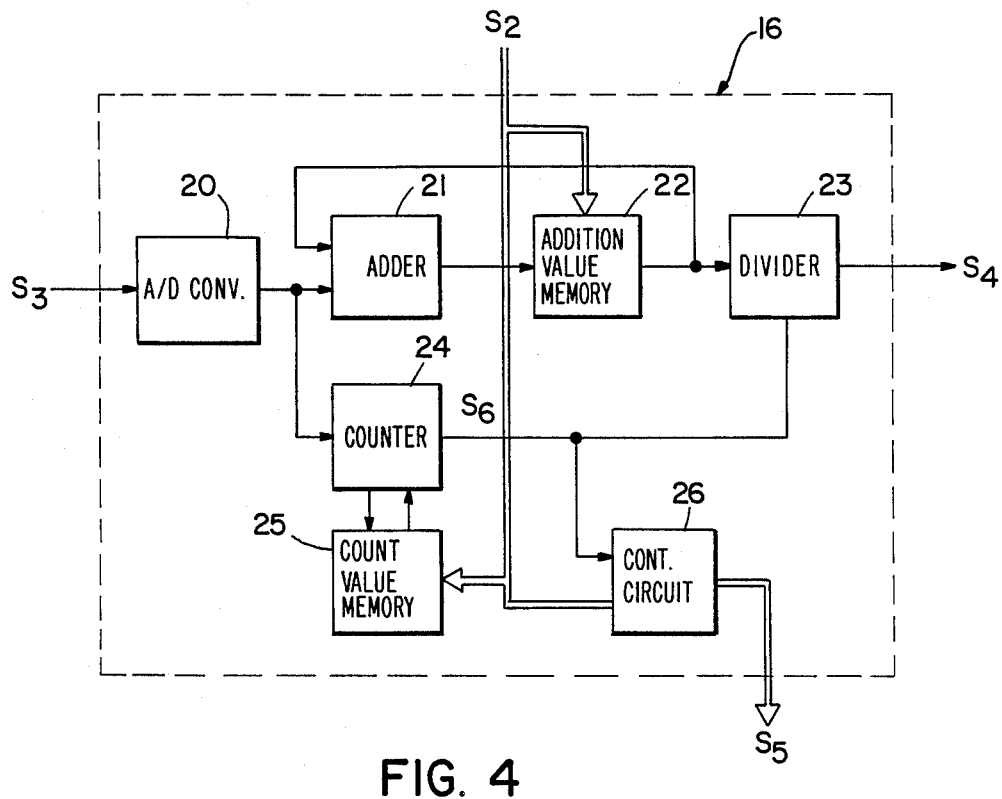
FIG. 4 is a block diagram of an illustrative averaging circuit for use in the circuitry of FIG. 1.
Figure 5:
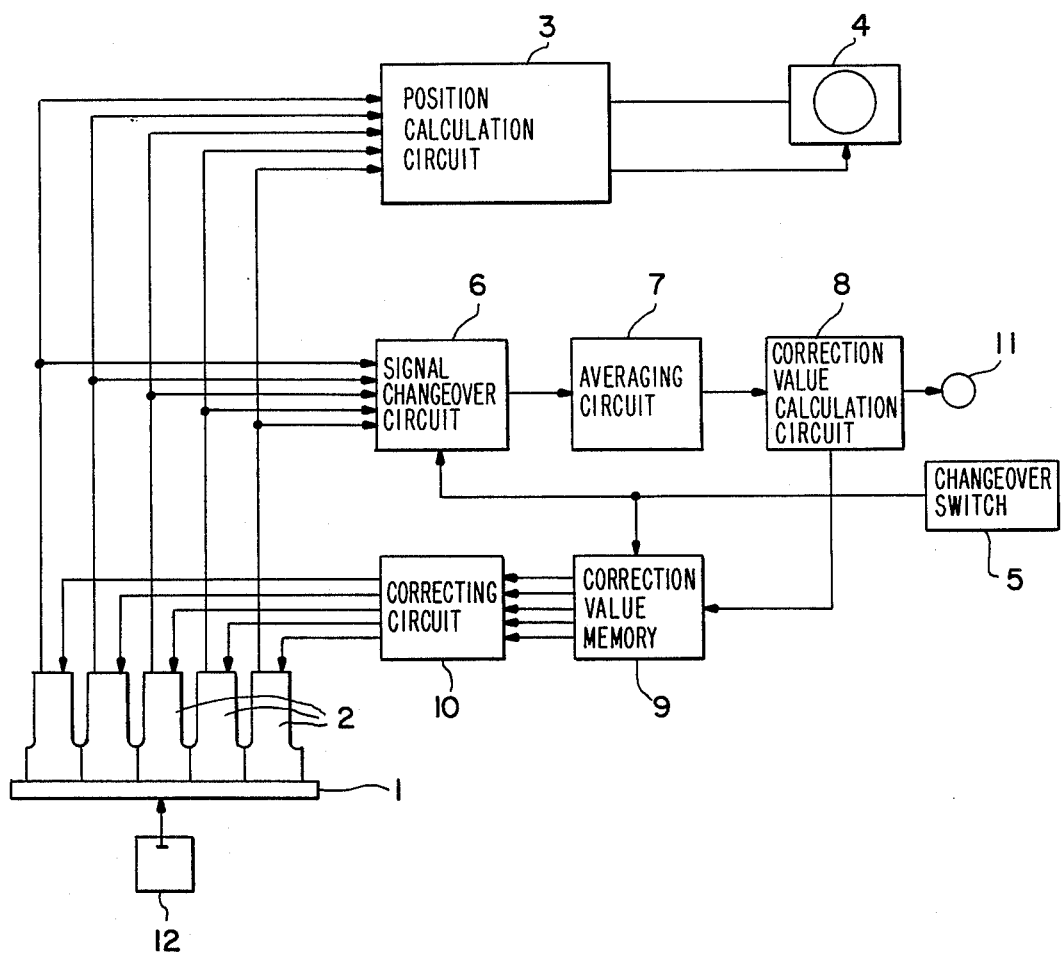
FIG. 5 is a block diagram of a prior art scintillation camera.

The output signal $S_3$ is transferred to the averaging circuit 16 from the signal changeover circuit 15c of the photomultiplier tube changeover circuit 15. The averaging circuit 16 calculates, for every photomultiplier tube, an arithmetical average of the respective magnitudes of the output signals $S_3$ produced by each photomultiplier tube 2 in response to a predetermined number of times of incident radioactive rays, to thereby remove the statistical variations in the output signals $S_3$ of the photomultiplier tube 2. As shown in FIG. 4, the averaging circuit 16 is constituted by an A/D converter 20, an adder 21, an addition value memory 22, a divider 23, a counter 24, a count value memory 25, and a control circuit 26. The A/D converter 20 converts the output signal $S_3$ of the photomultiplier tube 2 applied thereto from the signal changeover circuit 15c into a digital signal which is in turn applied to the adder 21. At the same time adder 21 receives addition data from addition value memory 22, adds this data to the digital signal received from A/D converter 20, and returns the resultant addition value to the addition value memory 22. The addition value memory 22 is constituted by memory elements, the number of which is the same as the plurality of photomultiplier tubes 2, so that the respective digital signals of the photomultiplier tubes 2 can be stored into corresponding memory elements as determined by $S_2$. At the same time as the digital signal is supplied to adder 21 from A/D converter 20, the digital signal is also supplied to the counter 24 so as to increment the count value of the latter by one. The count value memory 25 is constituted by memory elements, the number of which is the same as the plurality of photomultiplier tubes 2, so that the respective count values of the digital signals of the photomultiplier tubes 2 are stored in the corresponding memory elements. The divider 23 divides the total addition value of the digital signals for the specific one photomultiplier tube stored in the addition value memory 22 by a predetermined number of the radioactive rays stored in counter 24 under the control of $S_2$ and produces the arithmetical average $S_4$ as to the specific photomultiplier tube 2. When the arithmetical averaging calculation has been completed with respect to the specific photomultiplier tube 2, the control circuit 26 produces a correction value reading-out signal $S_5$ and resets to a reference value such as zero the addition value stored in the addition value memory 22 and the count value stored in the count value memory 25. In the thus arranged circuits, when radioactive rays are irradiated just under any selected one of the photomultiplier tubes 2, the addition value stored at that time in the addition value memory 22 with respect to the selected one photomultiplier tube 2 is read out. Then the adder 21 receives the read-out addition value, adds the addition value to the output signal of the photomultiplier tube 2 digitalized by the A/D converter 20, and returns the resultant addition value to the addition value memory 22. The count value as to the photomultiplier tube 2 at that point of time is read to the counter 24 from the count value memory 25, and the read-out count value is incremented by one and returned to the count value memory 25. The above-mentioned operations are repeated while irradiating the whole surface of the scintillator 1 with radioactive rays and when the count value for any one of the photomultiplier tubes 2 reaches a predetermined value which represents a predetermined number (e.g., 1000) of the incident radioactive rays, the counter 24 produces a count and signal $S_6$ to the divider 23 as well as the control circuit 26. The divider 23 divides the whole addition value of the digital signals with respect to the photomultiplier tube 2 by the prodetermined number, and produces the arithmetical average $S_4$ of the photomultiplier tube 2. The averaging circuit 16 is different from the conventional averaging circuit 7 of FIG. 5 in that it is possible in the former to perform the arithmetically averaging operations in parallel with the occurrence of the respective output signals $S_3$ of the plurality of photomultiplier tubes 2.

The arithmetical average $S_4$ is supplied to the correction value calculating circuit 17 from the averaging circuit 16. The correction value calculating circuit 17 acts to calculate a correction value for the respective photomultiplier tube 2. First, the correction value calculating circuit 17 seeks a difference between the arithmetical average and a reference value determined by the energy of incident radioactive rays, thereby obtaining the variations in sensitivity of the respective photomultiplier tube 2 on the basis of the difference. Next, the correction value calculating circuit 8 reads out the last correction value of the photomultiplier tube 2 from the correction value memory 18$a$ of the photomultiplier tube correcting circuit 18, amends the correction value in the direction of removing the deviation, and produces a new correction value $S_6$.

The correction value $S_6$ is supplied to the photomultiplier tube correcting circuit 18 from the correction value calculating circuit 17. The photomultiplier tube correcting circuit 18 controls the voltage applied to the respective photomultiplier tube 2 on the basis of the correction value $S_6$ and adjusts the sensitivity of the respective photomultiplier tube 2 automatically. The photomultiplier tube correcting circuit 18 includes the correction value memory 18$a$, and the correcting circuit 18$b$. The correction value memory 18$a$ stores the correction value $S_6$ for the respective photomultiplier tube 2 and outputs the correction value $S_6$ to the correcting circuit 18$b$. The correcting circuit 18$b$ includes D/A converters of the same number as the plurality of photomultiplier tubes and controls the voltage applied to the respective photomultiplier tube 2 corresponding to the correction value $S_6$ derived from the correction value memory 18$a$.

Next, the operation of the scintillation camera described above will be explained by reference to FIG. 1. When radioactive rays such as $\gamma$-rays or the like, released from radiation source 19 or a subject or the like, are irradiated onto the scintillator 1, the incident portion of the scintillator 1 flashes. The flash is detected by the respective photomultiplier tube 2 and converted into an electrical signal having a magnitude in proportion with the amount of incident light. The output signal is supplied to the position calculating circuit 3 from the respective photomultiplier tube 2 and the position calculating circuit 3 produces the position signal (x, y) and display signal U. The position signal (x, y) is supplied to the visual field section circuit 15$a$ which determines which selected one of the photomultiplier tubes 2 has been just irradiated with radioactive rays from directly thereunder by means of the electric windows W, W . . . (see FIG. 2) and produces the section signal $S_1$ for the visual field section corresponding to the selected one photomultiplier tube. The section signal $S_1$ is supplied to the counting rate judging circuit 15$b$, and at the same time, the display signal U is also supplied to the counting rate judging circuit 15$b$ from the position calculating circuit 3. The counting rate judging circuit 15$b$ compares the counting rate of the selected photomultiplier tube with a preset reference value and produces the changeover signal $S_2$ for the photomultiplier tube belonging to the specific visual field section. The changeover signal $S_2$ is supplied to both the signal changeover circuit 15$c$ and the averaging circuit 16. In response to the change-over signal $S_2$, the signal change-over circuit 15$c$ selects only the output signal $S_3$ of the selected one photomultiplier tube 2 and transfers the selected output signal $S_3$ to the averaging circuit 16. The averaging circuit 16 performs the arithmetically averaging operation of the output signal $S_3$ with respect to the photomultiplier tube 2. The averaging circuit 16 repeats this operation with respect to each photomultiplier tube 2 to which the radioactive rays are irradiated each time a radioactive ray is at an incident position with respect to the tube, until the number of the irradiated radioactive rays reaches a predetermined number (e.g., 1000) with respect to any one of the photomultiplier tubes 2 so as to terminate the averaging operation for that tube. Thus, the arithmetic average $S_4$ of the photomultiplier tube 2 is supplied to the correction value calculating circuit 17, and at the same time, the correction value reading signal $S_5$ of the photomultiplier tube 2 is supplied to the correction value memory 18$a$. The correction value calculating circuit 17 reads out the last correction value of the photomultiplier tube 2 from the correction value memory 18a on the basis of the correction value reading signal $S_5$ amends the correction value, and outputs a new correction value $S_6$. The new correction value $S_6$ is stored in the correction value memory 18a and at the same time supplied to the correcting circuit 18b from the correction value memory 18a, thereby making it possible to control the voltage applied to the photomultiplier tube 2 corresponding to the correction value $S_6$ and reduce the deviation in sensitivity of the photomultiplier tube 2. The arithmetically averaging operation in the averaging circuit 16 and the correction value amending operation in the correction value calculating circuit 17 are repeated until the arithmetical average becomes equivalent to the reference value in the correction value calculating circuit 17. When the arithmetical average becomes equivalent to the reference value, the adjustment of variations in sensitivity of the photomultiplier tube 2 is terminated. In a manner similar to this, automatic adjustment with respect to each photomultiplier tube is individually performed each time the number of radioactive rays incidental to the visual section 15a corresponding to the respective photomultiplier tube 2 exceeds the reference value set by circuit 15b, and thus the adjustment of variations in sensitivity is completed for all of the photomultiplier tubes 2.

What is claimed is:

1. In a scintillation camera for obtaining a distribution image of incident radioactive rays from a subject, having a scintillator for emitting flashes of light due to incident radioactive rays, a plurality of photomultiplier tubes where each is optically coupled with said scintillator for converting the light flashes into respective electric signals and a position calculating circuit for calculating an incident position of the radioactive rays on the scintillator in response to the output signals of each photomultiplier tube to produce a position signal indicative of an incident position of the radioactive rays on the scintillator and a display signal to a display unit, the improvement comprising:

a photomultiplier tube changeover circuit for determining in response to the position signal from said position calculating circuit which one of said photomultiplier tubes has just been irradiated with radiation rays and for outputting output signals only from said selected one photomultiplier tube;

an averaging circuit for taking an arithmetical average of output signals from said photomultiplier tube changeover circuit with respect to a predetermined number of said output signals so as to average the magnitude of the output signals of each photomultiplier tube, said average being successfully and parallely calculated for respective output signals from said photomultiplier tube changeover circuit during detection of the incident radioactive rays from the subject;

a correction value calculating circuit for detecting a variation in the sensitivity of said photomultiplier tube by comparing the averaged magnitude of the output signals from said averaging circuit with a reference value determined by the energy of the incident radioactive rays so as to calculate a correction value for said each photomultiplier tube; and a photomultiplier tube correcting circuit for controlling a voltage applied to said each photomultiplier tube so as to automatically adjust the sensitivity of each of said photomultiplier tubes.

2. A scintillation camera according to claim 1, wherein said photomultiplier tube changeover circuit comprises:

a visual field section circuit responsive to said position signal having electrical windows to form visual field sections respectively corresponding to the respective correspond to the position signals from said position calculating circuit, said visual field section circuit producing section signals which respectively correspond to said electrical windows;

a counting rate determining circuit responsive to said sectional signals and said display signals where the display signal corresponds to a counting rate of the radioactive rays incident to the respective visual field section, said counting rate determining circuit comparing said counting rate with a predetermined reference value to produce a changeover signal whenever said counting rate is larger than said predetermined reference value; and a signal changeover circuit responsive to said changeover signal for outputting said output signals only from said selected one photomultiplier tube.

3. A scintillation camera according to claims 1 or 2, wherein said photomultiplier tube correcting circuit comprises:

a correction value memory for storing the correction values for the respective photomultiplier tubes produced from said correction value calculating circuit; and a correcting circuit including; D/A converters corresponding to the respective photomultiplier tubes and for controlling the voltages applied on the respective photomultiplier tubes in accordance with the correction values stored in said correction value memory.

4. A method of operating a scintillation camera for obtaining a distribution image of incident radioactive rays from a subject, said camera having a scintillator for emitting flashes of light due to incident radioactive rays, a plurality of photomultiplier tubes where each of optically coupled with said scintillator for converting the light flashes into respective electric signals and a position calculating circuit for calculating an indicent position of the radioactive rays on the scintillator and a display signal to a display unit, said method comprising the steps of:

determining, in a photomultiplier tube changeover circuit, in response to the position signal from said position calculating circuit, which one of said photomultiplier tubes has has just been irradiated with radiation rays and outputting output signals only from said selected photomultiplier tube;

calculating, in an averaging circuit, an arithmetical average of output signals from said photomultiplier tube changeover circuit with respect to a predetermined number o said output signals so as to average the magnitude of the output signals of each photomultiplier tube, said calculating step comprising the step of calculating said average successively and in parallel for respective output signals from said photomultiplier tube changeover circuit durring detection of the incident radioactive rays from the subject;

detecting, by a correction value calculating circuit, a variation in the sensitivity of said photomultiplier tube by comparing the averaged magnitude of the output signals from said averaging circuit with a reference value determined by the energy of the incident radioactive rays so as to calculate a correction value for said each photomultiplier tube; and controlling, by a photomultiplier tube correcting circuit, a voltage applied to said each photomultiplier tube so as to automatically adjust the sensitivity of each of said photomultiplier tubes.

5. A method according to claim 4 wherein said step of determining comprises the step of forming visual field sections responsive to said position signal in a visual field section circuit having electrical windows, said sections respectively corresponding to the respective photomultiplier tubes, which, in turn, respectively correspond to the position signals from said position calculating circuit, and producing, by said visual field section circuit, section signals which respectively correspond to said electrical windows;

using a counting rate determining windows; responsive to said sectional signals and said display signals where the display signal corresponds to a counting rate of the radioactive rays incident to the respective visual field section, comparing said counting rate with a predetermined reference value to produce a changeover signal whenever said counting rate is larger than said predetermined reference value; and outputting, by a signal changeover circuit responsive to said changeover signal, said output signals only from said selected one photomultiplier tube.

6. A method according to claims 4 or 5 wherein said step of controlling a voltage comprises the steps of:

storing the correction values for the respective photomultiplier tubes produced from said correction value calculating circuit in a correction value memory; and controlling, by a correcting circuit including D/A converters corresponding to the respective photomultiplier tubes, the voltages applied on the respective photomultiplier tubes in accordance with the correction values stored in said correction value memory.

* * * * *